United States Patent Office 3,399,933
Patented Sept. 3, 1968

3,399,933
COMMUTABLE SHUTOFF VALVE WITH BALANCED SURFACES FOR PNEUMATIC APPARATUS, PARTICULARLY BRAKING SYSTEMS
Giuseppe Alfieri and Roberto Moriondo, Milan, Italy, assignors to Fabbrica Italiana Magneti Marelli S.p.A., a corporation of Italy
Original application July 12, 1965, Ser. No. 471,138, Divided and this application Feb. 2, 1967, Ser. No. 630,161
Claims priority, application Italy, July 15, 1964, 49,287/64; Mar. 24, 1965, 2,700/65
8 Claims. (Cl. 303—54)

ABSTRACT OF THE DISCLOSURE

A distributor for a pneumatic braking system including a first chamber connected to the braking unit, a second chamber connected to a pneumatic source and a piston actuated, movable pipe member for selectively connecting the chambers together and the first chamber to an atmospheric exhaust.

---

The present application is a division of copending application Ser. No. 471,138, filed July 12, 1965, which is complementary to application Ser. No. 321,587, filed Nov. 5, 1963, and now abandoned.

While the present application adheres to the inventive principles of the above-mentioned parent application, it concerns an advantageous embodiment of the balanced shutoff valves which are applicable, particularly in vehicle braking systems, such as, for example, distributors. Specifically, the purpose of this invention is that of embodying a balanced valve of the specified type, the assembly and maintenance of which are facilitated and the operation of which is insured under every aspect, even in the worst operating conditions, which may occur, whilst the seal is insured by gaskets of suitable material which may do away with the need to face or secure by adhesives the gaskets to the metal parts of the valve itself.

The valve as per this invention embodies a movable pipe member which is axially urged by spring means and provided with two sealing surfaces engageable with complementary surfaces one of which is represented by the body of the valve and the other by the means actuating the said pipe member, the valve being characterized by a flange and counterflange on the periphery of the pipe member to hold a sealing gasket in a resilient co-action condition; by a second flange secured to the valve body and in the opening of which is inserted the pipe member, and whose edge cooperates with the sealing gasket; through a crown secured to one of the pipe member ends and which cooperates in sealing relation with the pipe member actuating means, said sealing gasket having an annular contact surface substantially of the same diameter as the sealing surface represented by the crown of said pipe member.

The invention also concerns a distributor and a servo-auto-distributor provided with the balanced valves as above described.

The invention will be made clear by the following description taken in conjunction with the attached drawings which illustrate, by way of example only some embodiments of the balanced valve forming the object of this invention.

Figure 1:
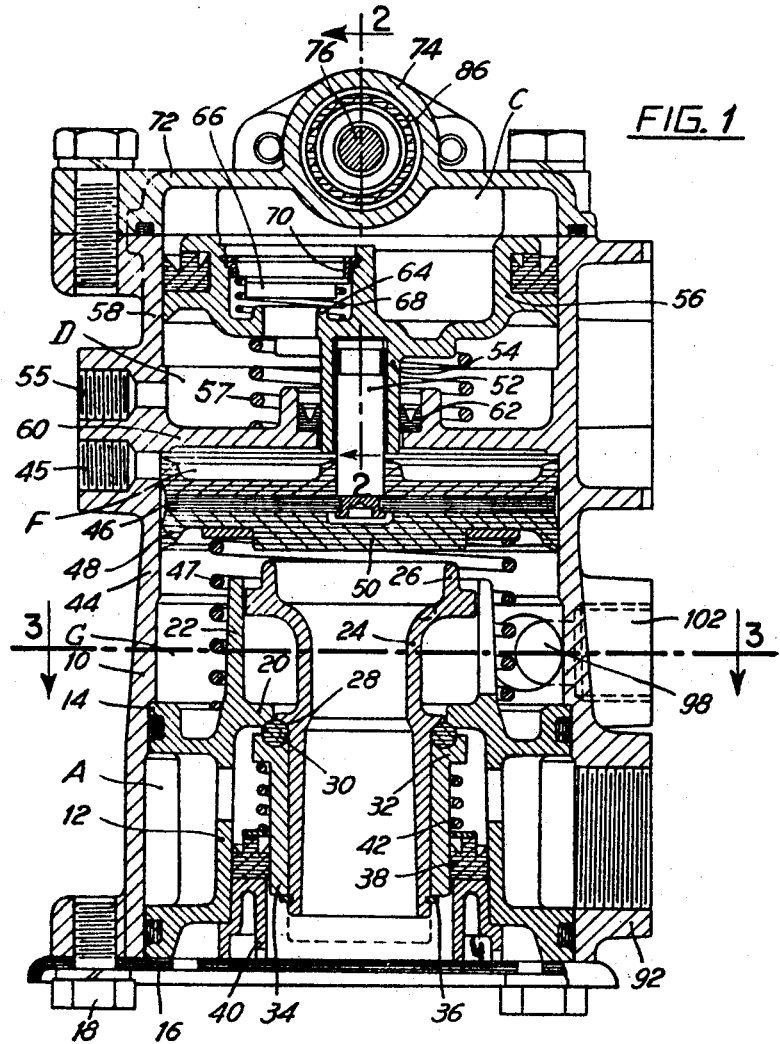
FIGURE 1 is an axial cross section of a servo-auto-distributor provided with a balanced valve as per this invention.
Figure 2:
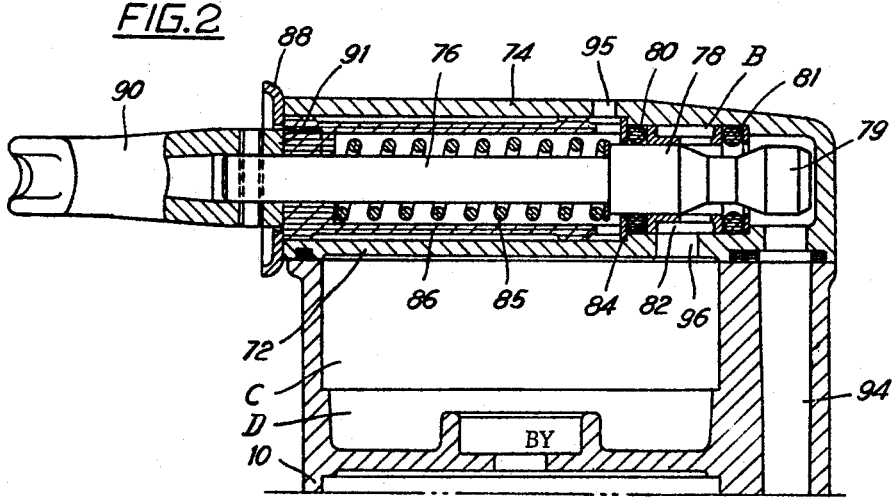
FIGURE 2 is a partial section taken on a line 2—2 shown in FIG. 1.
Figure 3:
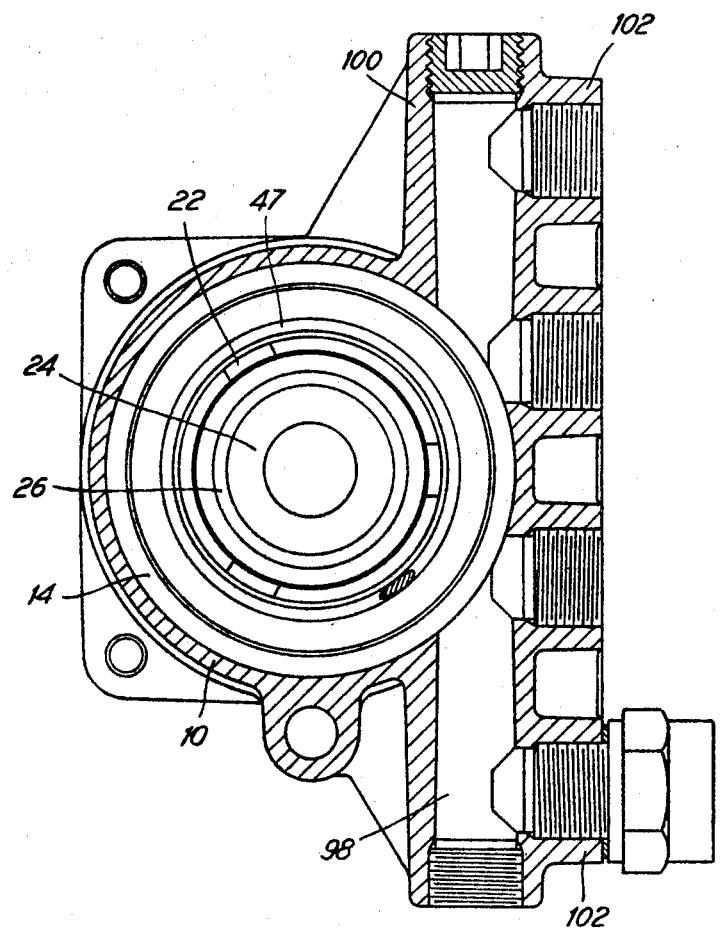
FIGURE 3 is a horizontal cross section taken along line 3—3 of FIG. 1.

The solution described and illustrated makes it possible to avoid securing the sealing gaskets to the metal parts and which, especially in the case of rubber gaskets, could require vulcanizing, in order to be perfect and undetachable. On the other hand, it is possible to replace the gaskets quickly when necessary, without need of replacing also metal parts of the balanced valve with reference to FIGS. 1 to 3, the servo-auto-distributor illustrated embodies a housing 10 which has in its inner part, a sleeve 12 which is secured and held in a sealed tight relationships against a shoulder 14 by a cover 16 secured to the housing by means of bolts 18. The sleeve 12 has on its inner part a flange 20 and above the latter a split crown 22 which form a guiding element for a pipe member 24 which represents the moving element of the valve of this invention. The pipe member has, at its upper end, a crown 26 (representing one of the two sealing surfaces of said movable element) and near to said crown, a flange 28 one of whose faces is recessed to receive the annular gasket (ring gasket) 30, which is toroidal in the case illustrated. The gasket 30 is held and secured conveniently by a flange 32 embodying a bushing 34 inserted about the lower end of pipe member 24 and secured there by a split ring 36 which partially engages a peripheral groove around the edge of said pipe member 24. A sealing gasket 38 is located between the bushing 34 and the inner wall of the sleeve 12 to further guide the pipe member 24, and is held by means of a ring 40 by the bottom cover 16, previously considered; moreover, the gasket 38 carries one of the ends of a helical spring 42 the other end of which engages flange 32 thus urging the toroidal gasket 30 against the sealing flange 20.

The housing 10 of the servo-auto-distributor has, toward its upper part, a first cylinder 44 for a relevant piston 46 provided with sealing gaskets, one of which consists of a disk 48 with flexible edges and which has, in its central part, a circular backing plate 50 suitable to cooperate with the previously mentioned crown 26 and which represents the movable sealing seat of the valve of this invention. The disk 48 is held in engagement with the piston 46 by the action of a spring 47 the other end of which is held by the sleeve 12.

A stem 52 is secured to the piston 46 which slides into engagement with the bottom of a blind hole carried, axially, by a second stem 54 secured to a second piston 56 which is co-axial with piston 46 and which moves in a relevant cylinder 58 which is an extension of cylinder 44. These cylinders 44 and 58 are separated from each other by a wall 60 which has, in its central part, an opening suitable for housing a gasket 62 which cooperates with the stem 54.

The piston 56 is provided with an opening, the upper edge of which forms a sealing seat 64 for a valve 66 urged by a spring 68, the action of which biases said valve away from its seat, causing it to engage with an annular stop 70 in a groove in the body of piston 56 so as to keep valve 66 slightly detached from its seat 64. The cylinder 58 is closed by a cover 72 which has a drilled lug 74 in its middle portion and which houses a manually actuated shutoff device consisting of a rod 76 one of the ends of which is provided with two coaxial pistons 78 and 79 separated by a peripheral groove (see FIG. 2).

Said two pistons cooperate alternately with respective sealing gaskets 80 and 81 located inside the drilled lug 74 and secured thereto by a split segment 84 through a suitable spacer 82.

A spring 85 is inserted on rod 76 so as to urge the double piston 78–79 from left to right (FIGURE 2) and is secured at its other end by a bushing 86 inserted in the hole of lug 74 and held therein by a cover 88.

The protruding end of rod 76 carries an actuating handle 90 or remote control transmission elements comprising, for example, tie rods, Bowden cables or similar devices connected to a control lever. The hub of this handle has, in a convenient position, a lug 91 which fits into a relevant seat in the cover 88 and which may be disengaged from said seat to position, axially, the double piston 78 and 79.

The parts described in connection with the servo-auto-distributor give use to a plurality of chambers pneumatically connected to each other and to the trailer braking system. Specifically, the annular chamber A, formed inside housing 10 by sleeve 12 communicates through a fitting 92 with a compressed air tank located on the trailer, in turn connected, in the known manner, with the compressed air supply source through the automatic braking system conduit. Chamber A is also connected, through a conduit 94 (see FIGURE 2) with an annular chamber B formed by the gaskets 80–81 inside the drilled lug 74 when the double piston 78–79 is in the position shown in FIGURE 2.

On the other hand, when the double piston is shifted toward the left, chamber B is made communicant with the atmosphere through a vent hole 95 located in a suitable position in lug 74; moreover, said chamber B is constantly in communication with chamber C pertaining to the cylinder-piston assembly 56–58, through a vent hole 96 in cover 72.

Chamber C is connected with a further chamber D in the cylinder-piston assembly 56–58 through a retaining valve 66, said chamber D being communicant through fitting 55 which receives the conduit for automatic braking in relation to what will be described hereinafter.

The upper chamber F of piston cylinder assembly 44–46 is connected, by fitting 45 with the adjustable braking conduit, which is, in turn, connected to the braking system distributor; the underlying chamber G, on the other hand, is permanently connected with a rectilinear chamber 98 which forms a manifold and which holds axially, a cross-piece 100 (see FIGURE 3) secured to the housing 10 and arranged perpendicularly in respect to the latter; said cross-piece has, along one of its generating lines, fittings 102 which receive the pipes leading to the brake actuating devices.

Chamber G communicates with the atmosphere through the opening in pipe member 24 and the holes in bottom cover 16, when the bottom plate 50 is disengaged from crown 26, and with chamber A through the slits in guide crown 22 when the gasket 30 is moved away from flange 20.

The operation of the servo-auto-distributor described infra is evident. When the brake actuating devices are in their normal idle position, the pressure prevailing in the automatic braking conduit and which is connected to fitting 55 is delivered to chamber D and, through the holding valve 66, (when open) passes into chamber C and the piston 56 is held in the lifted position only by the action of spring 57. Said pressure in chamber C, passes through vent 96, chamber B conduit 94, chamber A and fitting 92 into the trailer tank, since the double piston 78–79 is in the position shown in FIGURE 2, to establish communication between chamber B and conduit 94.

Under these conditions, if the distributor installed on the motor vehicle is actuated, in the modulating braking conduit connected to fitting 45, air flow is delivered into chamber F which displaces piston 46 in opposition to the action of spring 47. The circular bottom plate 50 engages with the crown 26 of pipe member 24 to shut off the communication between chamber G and the atmosphere; on the other hand, the gasket 30 is disengaged from flange 20 to establish a communication between said chamber G and chamber A. Furthermore, the compressed air from the trailer tank is delivered, through fittings 107 to the braking devices, so that the latter may be actuated. When the control action on the distributor ceases, the adjustable braking pipe and consequently also chamber F are made communicant with the atmosphere and spring 47 causes piston 46 to return to its lifted position, to shut off, on the one hand, a communication between chambers A and G and on the other, to establish communication of chamber G with the atmosphere.

During emergency braking (which is effected by discharging the pressure in the automatic braking pipe), the pressure prevailing in chamber B is annulled and piston 56 is therefore subjected only to the action of the pressure prevailing in chamber C, which is supplied by the pressure in the trailer tank. As soon as the pressure in chamber D drops, the prevailing pressure in chamber C closes the retaining valve 66 and acts on piston 56, displacing the latter in opposition to the action of spring 57.

The displacement of this piston, through stem 54, also causes piston 46 to shift establishing thereby the pneumatic connection previously considered, and resulting operation of the trailer brakes.

When the trailer is separated from the motor vehicle, with consequent interruption of the automatic braking conduit, the conditions just considered are repeated and the trailer brakes are actuated automatically. To release the brakes of the trailer when separated from the motor vehicle, the handle 90 is actuated to shift axially the rod 76 with its double piston 79–78, in opposition to the action of spring 85. The piston 79 engages with the gasket 81 to interrupt the communication between the trailer tank and chamber B, whilst the latter, is connected to the atmosphere, through the slot in the piston 78 and hole 95.

Meanwhile, equal pressures are established in chambers C and D and piston 56, is returned to its initial position, together with piston 46, through the action of springs 57 and 47, respectively. The pipe member 24 is also returned to its initial position, thereby interrupting the communication between chambers A and G, whilst the latter chamber is connected with the atmosphere to render the trailer braking devices inoperative.

The double piston 78–79 may be maintained permanently in the position last considered by disengaging lug 91 from its seat in cover 88, whilst engaging it with the external surface of the latter.

In view of the above description, taken in conjunction with the drawings, the advantages obtainable with the servo-auto-distributor should be evident to all those skilled in the art.

The horizontal arrangement of the fittings 102 for the brake actuating means, makes it possible to obtain wide ports for allowing air to pass, without requiring an increase in dimensions and especially the height of the servo-auto-distributor.

The increased power of the servo-auto-distributor, or the ratio between the effective active areas of piston 46–48 is achieved by suitably sizing the diameter of crown 26 in pipe member 24.

The area formed by said crown is substantially equal to the area formed by flange 20 in sleeve 12 and which represents a fixed seat for the valve shutting off communication between chambers A and G.

It is understood that modifications and changes may be introduced in the balanced valve, the distributor and servo-auto-distributor hereinabove described, for the purpose of meeting with the application and usage requirements, without departing from the scope of this invention.

We claim:

1. A distributor device for pneumatic systems comprising a casing, first and second chambers formed within said casing, an inlet and an outlet in said first chamber connected to a modulated braking circuit, a first passageway within said first chamber connecting said inlet with said outlet, a second passageway within said first chamber connecting said outlet with the atmosphere, a pipe member movably mounted within said first chamber, a first sealing means associated with said pipe member for blocking said first passageway when said pipe member is in one position, said second passageway being normally open when said pipe member is in said one position, first piston means mounted in said first chamber and being slidably mounted for movement axially of said pipe member, a second sealing means associated with said first piston means and said pipe member for blocking said second passageway when said first piston means is moved in contact with said pipe member, said first piston means being movable to press said pipe member to another position wherein said first passageway is opened, a second piston movably mounted in said second chamber, conduit means connecting said second chamber to an automatic braking conduit and a source of fluid under pressure, said second piston including means extending between said first and second chambers for actuating said first piston means, an annular sealing seat in said first chamber, said first sealing means including a sealing ring which bears against said annular seat in its one side and engages said pipe member on its other side to provide sealing therebetween, said first sealing means and said second sealing means being substantially of the same diameter, retaining means for holding said pipe member within said casing, spring means mounted between said retaining means and said first sealing means for urging said sealing ring against said annular seat, said movable pipe member further comprising a flange, a counter flange carried by the periphery of the pipe member so as to hold said sealing ring therebetween for coaction with said annular sealing seat of said casing and in whose opening said pipe member is inserted and the edge of which engages with said sealing ring; a crown secured to one end of the pipe member, a gasket on said actuating means engaging with said crown, said sealing ring having an annular contact surface which is substantially of the same diameter as the sealing surface of said crown.

2. A distributor device according to claim 1 in which said first piston means comprises a disk provided with an axially extending first stem and at least one annular sealing diaphragm, said diaphragm having at its central part circular lug forming a seat which cooperates in a sealing relation with said pipe member.

3. A distributor device according to claim 2 in which said second piston means has an axially depending, hollow second stem, said first and second stems interengaging to form a stop for said first piston in only one direction of movement.

4. A distributor device according to claim 1 in which said second piston is provided with a spring biased retaining valve which controls communcation between first and second portions of said second chamber.

5. A distributor device according to claim 1 in which said casing further comprises a manifold chamber the axis of which is substantially horizontal with respect to the longitudinal axis of said device, a plurality of pipe fittings in said manifold chamber for connection to a plurality of fluid brake actuating means.

6. A distributor device according to claim 1 in which said casing has a cover closing the end adjacent said second chamber, said cover comprising a substantially diametrical hollow lug, double piston means slidably mounted in said lug and axially movable between two operative positions, said double piston in a first position controlling communication of said second chamber with a source of fluid under pressure and in a second position controlling communication of said second chamber with the atmosphere.

7. A distributor device according to claim 6 in which said double piston means is manually operable.

8. A distributor device according to claim 6 in which annular gasket means are provided in said hollow lug to provide sealing means for said double piston in its operative positions.

References Cited

UNITED STATES PATENTS

| | | | |
|---|---|---|---|
| 3,183,042 | 5/1965 | Bueler | 303—54 XR |
| 3,291,539 | 12/1966 | Bueler | 303—52 |

MILTON BUCHLER, *Primary Examiner.*

J. McLAUGHLIN, *Assistant Examiner.*